500
UNITED STATES PATENT OFFICE.

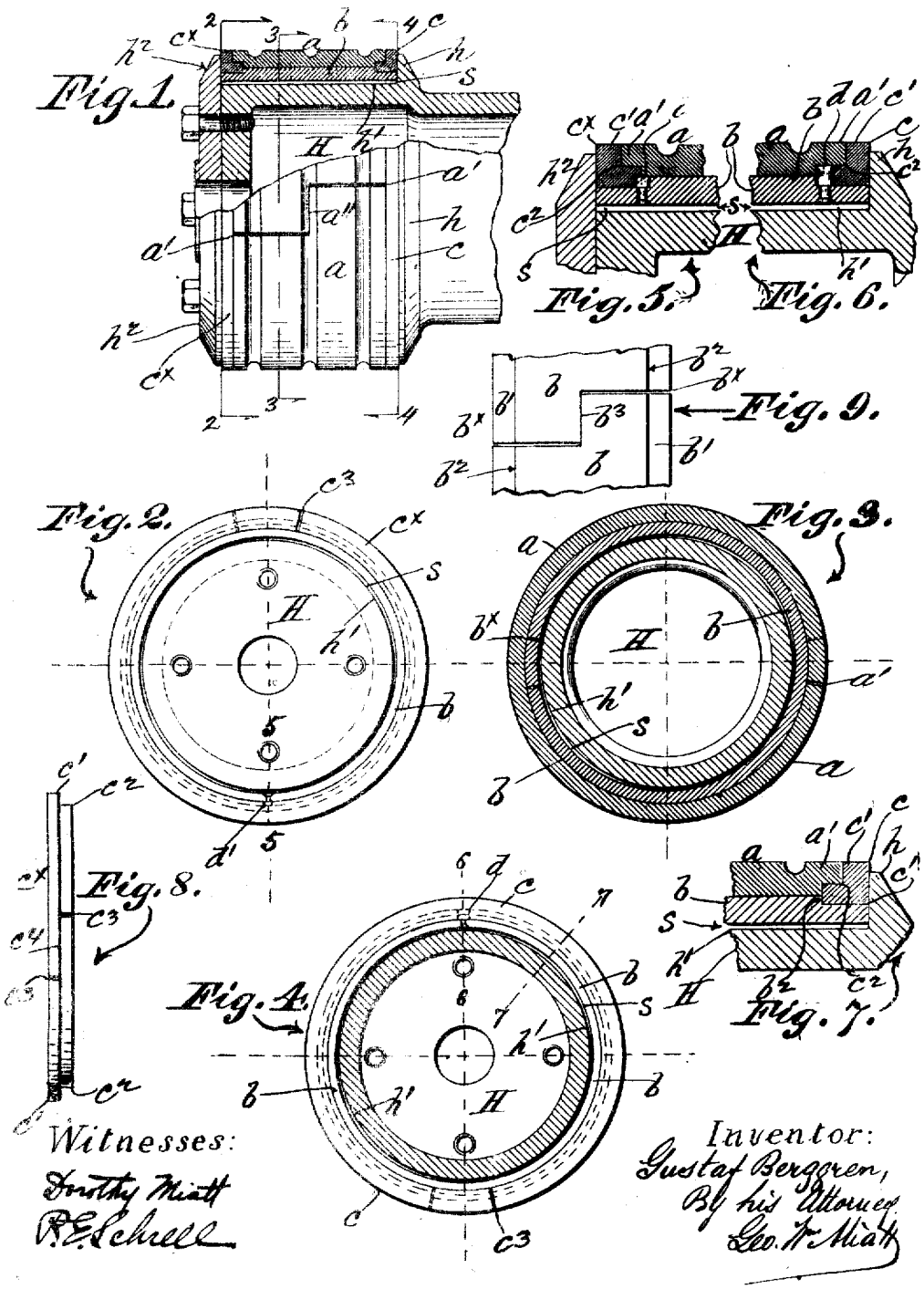

GUSTAF BERGGREN, OF BROOKLYN, NEW YORK.

EXPANSIBLE ANNULAR PACKING.

1,283,461.   Specification of Letters Patent.   Patented Nov. 5, 1918.

Application filed April 5, 1918. Serial No. 226,864.

*To all whom it may concern:*

Be it known that I, GUSTAF BERGGREN, a citizen of the United States, and a resident of the borough of Brooklyn, county of Kings, city and State of New York, have invented certain new and useful Improvements in Expansible Annular Packings, of which the following is a specification.

My invention relates to annular expansible packings for pistons, valve heads, and the like, which are subjected to fluid pressure, and the object is to effectually exclude such fluid pressure from the packing rings, and especially from the rear thereof, so as to obviate leakage and internal pressure, and thereby reduce peripheral frictional contact of the rings with the concave cylindrical surfaces to which they are opposed in action, all as hereinafter fully set forth,—the invention consisting in the specific construction and arrangement of parts herein described and claimed,—distinctive features being the use of three contact rings in conjunction with an expansible ring; in the method of isolating the latter; and in the method of permanently positioning the ring splits in equidistant relationship to each other, so as to practically seal the rings against the admission therein-between of the fluid power pressure.

In the accompanying drawings,

Figure 1, is a sectional elevation of a piston head or equivalent provided with my improved packing means, the key dowels being omitted;

Fig. 2, is an elevation taken upon plane of line 2—2, Fig. 1, the end cap or follower plate being omitted;

Fig. 3, is a section taken upon plane of line 3—3, Fig. 1;

Fig. 4, is a sectional elevation taken upon plane of line 4—4, Fig. 1;

Fig. 5, is a sectional detail upon a larger scale, taken upon plane of line 5—5, Fig. 2;

Fig. 6, is a like sectional detail taken upon plane of line 6—6, Fig. 4;

Fig. 7, is an annular sectional detail taken upon plane of line 7—7, Fig. 4;

Fig. 8, is an edge view of one of the side packing rings;

Fig. 9, is a peripheral view of a portion of the base ring showing the offset split therein.

The piston head H, is formed with an annular shoulder $h$, projecting beyond, and at right angles to, the cylindrical packing seat $h'$, which is of a width equal to that of the floating base ring $b$, which latter is of such interior diameter as to afford a space $s$, between it and said cylindrical seat $h'$, sufficient to compensate for, and allow the packing to adapt itself to, any slight variations or inequalities of the surfaces with which the outer packing rings $a$, $c$, $c^x$, contact peripherally.

The edges of the expansible ring $b$, are of less thickness than the medial portion thereof, forming seats $b'$, for the side packing rings $c$, $c^x$, said seats $b'$, having shoulders $b^2$, which overlap the inner edges of said side rings $c$, $c'$, as shown more particularly in Figs. 1 and 7. The ring $b$, is split transversely, as at $b^x$, Figs. 3 and 9, the split being preferably offset as shown to form the lap $b^3$, although this is not essential, since the well known straight diagonal split may be substituted if desired. The central lap $b^3$, however is effective in preventing the passage of fluid pressure through the packing.

The side rings $c$, $c^x$, are L-shaped or rectangular in cross section, consisting of the flanges $c'$; and seats $c^2$, for the reception of the edges $a'$, of the main or central contactual ring $a$. Each side ring $c$, $c^x$, is split as at $c^3$, and these splits are also preferably, although not necessarily, offset, as in the case of the expansible ring $b$, and for the same reason, thereby forming close longitudinal laps $c^4$, one of which is shown in Fig. 8. For the same purpose and reason the central bearing ring $a$, is in like manner formed preferably with an offset split $a'$, having a close central lap $a''$, shown more particularly in Fig. 1.

Each of the four elastic resilient expansible rings $a$, $b$, $c$, $c^x$, being thus split transversely, either with a diagonal or offset cut, the several splits are arranged and spaced apart in equidistant relationship as related to each other and to the piston head. That is to say the arrangement is quadrangular. For instance, as related to the position of parts shown in Figs. 1, 2, 3, and 4, of the drawings, the split $c^3$, of the outer side ring $c^x$, is at the top; that ($a'$) of the medial bearing ring $a$, at the right hand side thereof; that ($c^2$) of the inner side ring $c$, at the bottom; and that ($b^x$) of the ring $b$, at the left hand side,—the bisecting vertical and horizontal dotted lines in these views being coincident with the medial points of such splits.

By this quadrangular arrangement of the split rings $a$, $b$, $c$, $c^x$, I reduce to a minimum the possibility of the creeping of the power-fluid through and behind the packing considered as a whole; and this danger is further eliminated by covering lines of juncture between the ring $b$, and the side ring $c$, $c^x$. This latter result is attained in so far as the inner side ring $c$, is concerned by the permanent shoulder $h$, on the piston head H, while a like result is attained in so far as the outer ring $c^x$, is concerned, by means of the cap or follower plate $h^2$, which overlaps the line of juncture between said ring $c^x$, and the ring $b$, as shown more particularly in Figs. 4 and 5 of the drawings.

In order to maintain the above described relative arrangement of the several packing rings they are coupled together by key dowels, as shown particularly in Figs. 5 and 6. Thus in the drawings one key dowel $d$, interlocks with the ring $b$, side ring $c$, and medial bearing ring $a$, as illustrated in Fig. 6, while in Fig. 5, the dowel key $d'$, interlocks with the ring $b$, and the other side ring $c^x$, thus preventing the shifting of said rings upon and with relation to each other. By preference these dowel keys $d$, $d'$, are diametrically opposed to each other as indicated by the section line 5—5, on Fig. 2, and the section line 6—6, on Fig. 4, thus balancing whatever strain is involved by the copulation of the rings.

My peripheral packing thus constructed and arranged is simple, cheap and effective. A year's practical test under severe conditions has demonstrated the fact that it reduces frictional resistance and loss of power fluid to such an extent as to effect a material economy in the amount of fuel requisite to attain prescribed results, while the life and efficiency not only of the packing but also of the surfaces with which it contacts peripherally, are prolonged.

What I claim as my invention and desire to secure by Letters Patent is,

1. An expansible elastic resilient packing of the character designated, in combination with the head to which it is applied, comprising a floating expansible ring having seats, L-shaped side contact rings having seats and resting on the seats of the said expansible ring and a medial contact ring resting upon the expansible ring and having offsets at its edges resting upon the seats of the side rings.

2. An expansible elastic resilient packing of the character designated in combination with the head to which it is applied, comprising a floating expansible ring having shouldered seats, L-shaped side contact rings positioned on said shouldered seats and having shouldered seats, and a medial contact ring resting on the ring and the edges of which are positioned on the shouldered seats of said side rings, together with flanges on the head which overlap the lines of juncture between said expansible ring and said side contact rings, for the purpose described.

3. An expansible elastic resilient packing of the character designated in combination with the head to which it is applied, comprising a floating expansible ring, having shouldered seats on its outer edges, L-shaped side contact rings positioned on said shouldered seats and having shouldered seats, and a medial contact ring the edges of which are positioned on the shouldered seats of said side rings, said rings being each split transversely having the adjacent edges overlapping and being arranged with the several splits positioned substantially quadrantially, for the purpose described.

4. An expansible elastic resilient packing of the character designated in combination with the head to which it is applied, comprising a floating expansible ring having shouldered seats on its outer edges, L-shaped side contact rings positioned on said shouldered seats, and a medial contact ring the edges of which are positioned on the shouldered seats of said side rings, said rings being each split transversely having the adjacent edges overlapping and being arranged with the several splits positioned substantially quadrantially, together with means for coupling said rings positively together in such relationship, for the purpose described.

5. An expansible elastic resilient packing of the character designated in combination with the head to which it is applied, comprising a floating expansible ring having shouldered seats on its outer edges, L-shaped side contact rings positioned on said shouldered seats, and a medial contact ring the edges of which are positioned on the shouldered seats of said side rings, said rings being each split transversely having the adjacent edges overlapping and being arranged with the several splits positioned substantially quadrantially, means for coupling said rings positively together in such relationship, and flanges on the head overlapping the lines of juncture between said expansible ring and said side contact rings, for the purpose described.

6. An expansible elastic resilient packing of the character designated, comprising an expansible ring of greater diameter than the member which it embraces to provide a space between said ring and member, said ring having shouldered seats at opposite edges, L-shaped side contact rings positioned on said shouldered seats, a medial contact ring resting upon the said ring and shouldered at its edges and positioned on the shouldered seats of the side rings and key dowels interlocking with the ring and the side rings for preventing a shifting of the rings upon and with relation to each other.

GUSTAF BERGGREN.

Witnesses:
Geo. Wm. Miatt,
Dorothy Miatt.